(12) United States Patent
Huijsing et al.

(10) Patent No.: US 11,999,485 B2
(45) Date of Patent: Jun. 4, 2024

(54) BEVERAGE MANAGEMENT SYSTEM

(71) Applicant: B/E Aerospace, Inc., Winston Salem, NC (US)

(72) Inventors: Hans Huijsing, Usselstein (NL); Varun Raman, The Hague (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 156 days.

(21) Appl. No.: 17/851,337

(22) Filed: Jun. 28, 2022

(65) Prior Publication Data
US 2022/0411066 A1    Dec. 29, 2022

(30) Foreign Application Priority Data
Jun. 28, 2021    (EP) .................................... 21182086

(51) Int. Cl.
*H04W 4/80*    (2018.01)
*B64D 11/00*    (2006.01)
*B64D 11/04*    (2006.01)

(52) U.S. Cl.
CPC .......... *B64D 11/0007* (2013.01); *B64D 11/04* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 6,155,158 A * | 12/2000 | Anson | A47J 31/007 99/290 |
| 10,133,992 B2 | 11/2018 | Walter et al. | |
| 10,984,203 B1 | 4/2021 | Huijsing | |
| 2008/0120187 A1* | 5/2008 | Wesley | G06Q 50/12 705/15 |

(Continued)

FOREIGN PATENT DOCUMENTS

| | | |
|---|---|---|
| CN | 210047629 U | 2/2020 |
| DE | 102018205289 A1 | 10/2019 |

(Continued)

OTHER PUBLICATIONS

Abstract for DE102018205289 (A1), Published: Oct. 10, 2019, 1 page.

(Continued)

*Primary Examiner* — John F Mortell
(74) *Attorney, Agent, or Firm* — CANTOR COLBURN LLP

(57) ABSTRACT

A system for beverage management. The system includes at least one receptacle for receiving a beverage, said receptacle comprising at least one identification means that is configured to identify the type of beverage provided in the at least one receptacle. The system further comprises a trolley comprising at least one identification reader that is configured to read the identification means to determine the beverage present in the at least one receptacle, said trolley further comprising a weight sensor configured to determine the weight of the at least one receptacle. The system further (Continued)

includes a central programming unit configured to determine if the beverage within the at least one receptacle is below a pre-determined volume threshold based on the identity of the beverage and the weight value.

15 Claims, 2 Drawing Sheets

(56) References Cited

U.S. PATENT DOCUMENTS

| | | | | |
|---|---|---|---|---|
| 2010/0018220 | A1* | 1/2010 | Modad | G01G 23/18 700/275 |
| 2015/0065024 | A1* | 3/2015 | Moran | B64D 11/04 454/74 |
| 2016/0272469 | A1* | 9/2016 | Carroll | G06Q 50/12 |
| 2017/0275146 | A1* | 9/2017 | Hollister | B67D 1/0885 |
| 2019/0309955 | A1 | 10/2019 | Castillo et al. | |
| 2020/0108932 | A1* | 4/2020 | Vandewall | F25D 17/045 |
| 2021/0125142 | A1* | 4/2021 | Bloom | G06Q 20/203 |

FOREIGN PATENT DOCUMENTS

| | | |
|---|---|---|
| EP | 3553717 A1 | 10/2019 |
| JP | 6000534 B2 | 9/2016 |
| WO | 2017176116 A1 | 10/2017 |
| WO | 2018077466 A1 | 5/2018 |
| WO | 2020234336 A1 | 11/2020 |

OTHER PUBLICATIONS

Abstract for CN210047629 (U), Published: Feb. 11, 2020, 1 page.
Abstract for JP6000534 (B2), Published: Sep. 28, 2016, 1 page.
Abstract of EP3553717 (A1), Published: Oct. 16, 2019, 1 page.
European Search Report for Application No. 21182086.5, dated Dec. 23, 2021, 5 pages.

* cited by examiner

BEVERAGE MANAGEMENT SYSTEM

CROSS REFERENCE TO RELATED APPLICATIONS

This application claims priority to European Patent Application No. 21182086.5 filed Jun. 28, 2021, the entire contents of which is incorporated herein by reference.

TECHNICAL FIELD

The present disclosure relates to a beverage management system for use in transportation vehicles, for example, an aircraft. In particular, the present disclosure relates to management of beverages served by cabin attendants during the journey.

BACKGROUND

Aircrafts and trains generally include cabin attendants to maintain the safety and comfort of the passengers. In some instances, cabin attendants also provide in-journey snacks and beverages to passengers. Presently, cabin attendants in the galley that prepare beverages to be served to passengers, for example tea or coffee, are not aware when a receptacle holding the beverage is running near empty. This can lead to a delay in preparing and re-stocking beverages, and also can lead to excess drinks being prepared which is wasteful. Further, the cabin crew would need to communicate with each other (e.g. by walking up and down the aisle) to inform the cabin attendant that is preparing the beverages that new drinks are required, which is inefficient.

The present disclosure provides a solution for this need.

SUMMARY

There is provided a system for beverage management. The system includes at least one receptacle for receiving a beverage, said receptacle comprising at least one identification means that is configured to identify the type of beverage provided in the at least one receptacle. The system further includes a trolley comprising at least one identification reader that is configured to read the identification means to determine the beverage present in the at least one receptacle, said trolley further comprising a weight sensor configured to determine the weight of the at least one receptacle. The system further includes a central programming unit configured to determine if the beverage within the at least one receptacle is below a pre-determined volume threshold based on the identity of the beverage and the weight value.

The at least one identification means may be at least one radio-frequency identification, RFID, tag. The at least one RFID tag may be located on, in, or around the at least one receptacle.

The at least one identification reader may be at least one radio-frequency identification, RFID, reader and may be embedded in, or on, a top surface of the trolley.

The central programming unit may be configured to send a signal, via a wireless interface, to a galley of an aircraft to indicate that the at least one receptacle is below the pre-determined volume threshold and weight value. The signal may be configured to be sent, via the wireless interface, to a beverage dispenser/maker.

The beverage may include at least one of soda, water, coffee, tea or ice.

There is also provided a method of beverage management. The method includes providing at least one receptacle for receiving a beverage, said receptacle comprising at least one identification means that identifies the type of beverage provided in the at least one receptacle. The method further includes providing a trolley comprising at least one identification reader that reads the identification means to determine the beverage present in the at least one receptacle, said trolley further comprising a weight sensor that determines the weight of the at least one receptacle. There is also provided a central programming unit that determines if the beverage within the at least one receptacle is below a pre-determined volume threshold based on the identity of the beverage and the weight value.

The at least one identification means may be at least one radio-frequency identification, RFID, tag. The at least one RFID tag may be located on, in, or around the at least one receptacle.

The at least one identification reader is at least one radio-frequency identification, RFID, reader that may be embedded in, or on, a top surface of the trolley.

The central programming unit may send a signal, via a wireless interface, to a galley of an aircraft to indicate that the at least one receptacle is below the pre-determined volume threshold and weight value.

The signal may be sent, via the wireless interface, to a beverage dispenser/maker.

DETAILED DESCRIPTION

Figure 1:
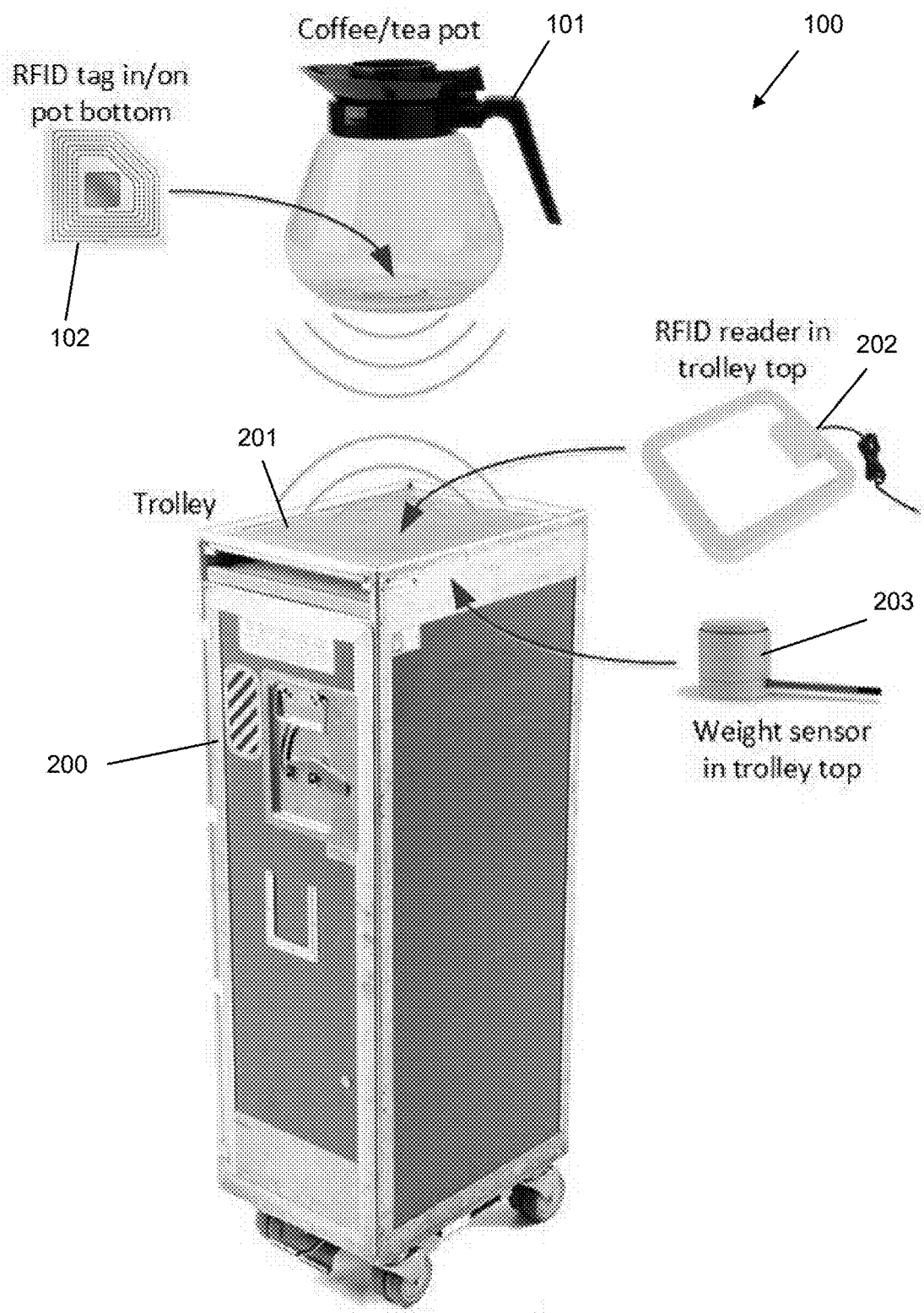
FIG. 1 shows an example of a beverage management system.

FIG. 1 shows a system 100 for beverage management. The system 100 may include a receptacle 101 for holding a beverage (for example, tea, coffee, water, etc.) and identification means (e.g. bar code, ID tag etc). In the example shown in FIG. 1, the identification means may be a radio-frequency identification (hereinafter 'RFID') tag 102 located on, in, or around the receptacle 101. The RFID tag 102 may hold information about the type of beverage that is present in the receptacle (for example, tea, coffee, water etc.). For example the RFID tag 102 may include a digital token (not shown) that identifies the beverage that is contained in the receptacle 101. Although the receptacle 101 in FIG. 1 resembles a coffee or tea pot, it is envisaged that the receptacle 101 may include other kinds of beverages such as water, soda, hot beverages and the like. Further, in the example shown, there is presented one receptacle 101. However, it is envisaged that there may be more than one receptacle 101 (with another RFID tag) holding another beverage. Further still, the beverage may not be confined to liquids and may include ice.

The system 100 in FIG. 1 may include a trolley 200 that includes a top surface 201. An identification reader (e.g. bar-code scanner, camera etc) is embedded in or on the top surface 201 of the trolley 200. In the example shown in FIG. 1, the identification reader is a RFID reader 202 is embedded in, or on, the top surface 201 of the trolley 200. The RFID reader 202 is configured to receive and read the digital token from the RFID tag 102 located on, in, or around the receptacle 101 in order to identify the beverage. There is also be provided a weight sensor 203 located on, or in, the top surface 201 of the trolley 200. The weight sensor 203 may then feed weight values of the specific beverage contained in the receptacle 101 to a central programming unit (shown in FIG. 2) to then alert cabin attendants that the volume of beverage in the receptacle 101 is low or near empty. As with the receptacle 101 described above, there may be more than one RFID reader 202 and more than one weight sensor 203 depending on how many beverages are being served to passengers.

Figure 2:
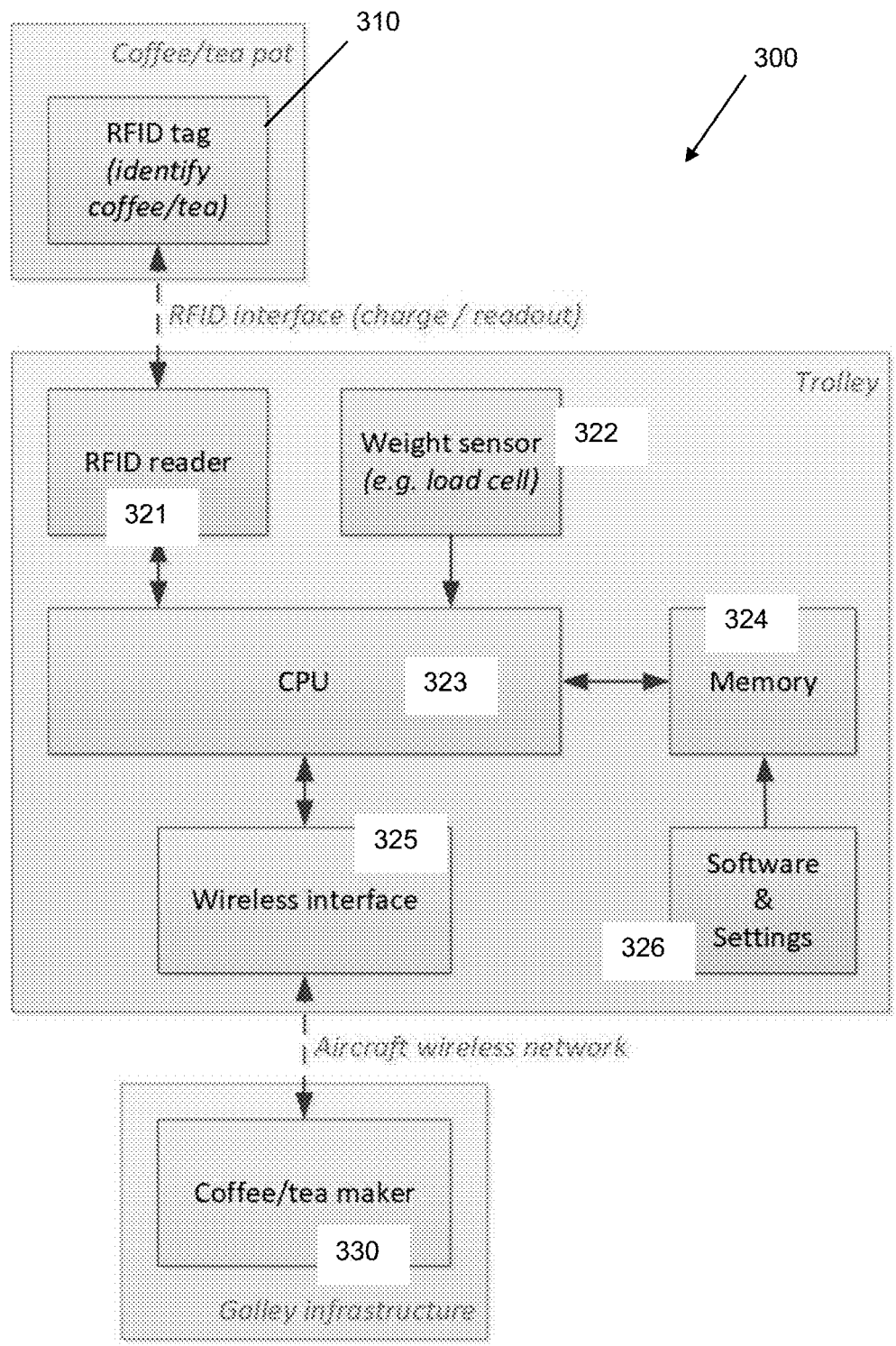
FIG. 2 shows an example system architecture of the beverage management system of FIG. 1.

A system architecture 300 of the system 100 is shown in FIG. 2, with reference to the features of FIG. 1. The RFID tag 310 corresponds to the RFID tag 102 and includes a digital token that identifies the beverage contained in the receptacle 101. A signal identifying the beverage is sent to the RFID reader 321, which corresponds to the RFID reader 202 described above. The RFID reader 321 sends the identity of the beverage to a central programming unit 323. The weight sensor 322 corresponds to the weight sensor 203 described above in relation to FIG. 1. The weight sensor 322 may measure the weight of the receptacle 101 and send a weight value to the central programming unit 323.

The system architecture 300 may also include memory 324 that comprises software and settings 326 configured to determine the status of the beverage (e.g. whether the beverage is below a pre-determined volume threshold, the weight of the receptacle etc). Settings that are stored in the memory 324 may include the particular values of the pre-determined volume threshold and weight of an empty and/or full receptacle. The settings may be manually input or automatically input to the memory 324. The software and settings 326 stored in the memory 324 may be sent to the central programming unit 323 during operation.

The central programming unit 323 may then determine, based on the identity of the beverage and weight value, which beverage receptacle is running low or near empty. If the central programming unit 323 determines that the beverage contained in the receptacle 101 is below a pre-determined volume threshold, and below a weight value, a signal indicating that the receptacle 101 is low or near empty is sent to a wireless interface 325. The wireless interface 325 may send a message to the galley to alert a cabin attendant that a particular beverage is running low or empty such that the cabin attendant can begin preparing that particular beverage to refill the receptacle. The wireless interface 325 may also, or optionally, communicate to a beverage dispenser/maker 330 of a galley insert that the receptacle is running low of a certain type of beverage. The beverage dispenser/maker 330 may then automatically prepare a particular beverage to refill the receptacle.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A system for beverage management, the system comprising:
    at least one receptacle for receiving a beverage, said receptacle comprising at least one identification means that is configured to identify the type of beverage provided in the at least one receptacle;
    a trolley comprising at least one identification reader that is configured to read the identification means to determine the beverage present in the at least one receptacle, said trolley further comprising a weight sensor configured to determine the weight of the at least one receptacle; and
    a central programming unit configured to determine if the beverage within the at least one receptacle is below a pre-determined volume threshold based on the identity of the beverage and the weight value.

2. The system of claim 1, wherein the at least one identification means is at least one radio-frequency identification, RFID, tag.

3. The system of claim 2, wherein the at least one RFID tag is located on, in, or around the at least one receptacle.

4. The system of claim 1, wherein the at least one identification reader is at least one radio-frequency identification, RFID, reader.

5. The system of claim 4, wherein the RFID reader is embedded in, or on, a top surface of the trolley.

6. The system of claim 1, wherein the central programming unit is configured to send a signal, via a wireless interface, to a galley of an aircraft to indicate that the at least one receptacle is below the pre-determined volume threshold and weight value.

7. The system of claim 6, wherein the signal is configured to be sent, via the wireless interface, to a beverage dispenser/maker.

8. The system of claim 1, wherein the beverage comprises at least one of soda, water, coffee, tea or ice.

9. A method of beverage management, the method comprising:
    providing at least one receptacle for receiving a beverage, said receptacle comprising at least one identification means that identifies the type of beverage provided in the at least one receptacle;
    providing a trolley comprising at least one identification reader that reads the identification means to determine the beverage present in the at least one receptacle, said trolley further comprising a weight sensor that determines the weight of the at least one receptacle; and
    providing a central programming unit that determines if the beverage within the at least one receptacle is below a pre-determined volume threshold based on the identity of the beverage and the weight value.

10. The method of claim 9, wherein the at least one identification means is at least one radio-frequency identification, RFID, tag.

11. The method of claim 10, wherein the at least one RFID tag is located on, in, or around the at least one receptacle.

12. The method of claim 9, wherein the at least one identification reader is at least one radio-frequency identification, RFID, reader.

13. The method of claim 12, wherein the RFID reader is embedded in, or on, a top surface of the trolley.

14. The method of claim 9, wherein the central programming unit sends a signal, via a wireless interface, to a galley of an aircraft to indicate that the at least one receptacle is below the pre-determined volume threshold and weight value.

15. The method of claim 14, wherein the signal is sent, via the wireless interface, to a beverage dispenser/maker.

* * * * *